N. R. PRATT.
Carriage-Wheel Wrenches.
No. 215,479. Patented May 20, 1879.
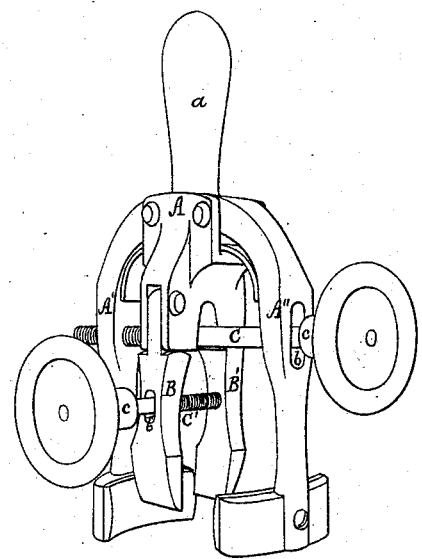
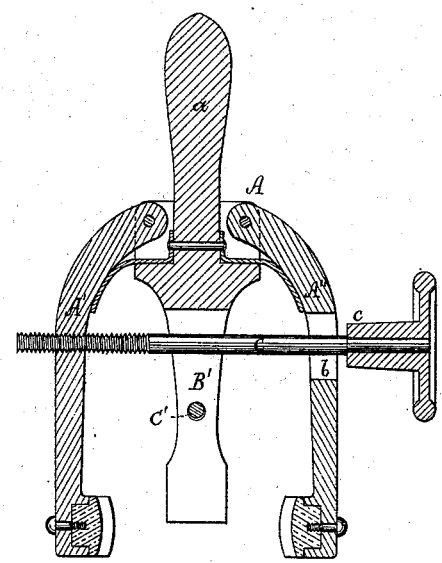
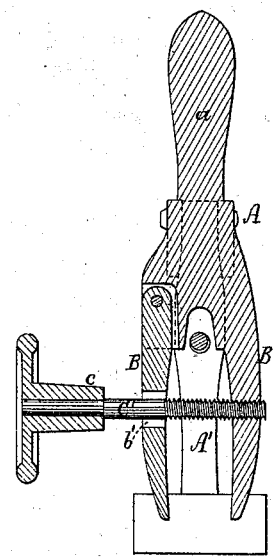
Witnesses.
S. N. Piper
John Birkenhead
Inventor.
Nelson R. Pratt
by attorney,
R. H. Eddy

UNITED STATES PATENT OFFICE.

NELSON R. PRATT, OF DOVER SOUTH MILLS, MAINE.

IMPROVEMENT IN CARRIAGE-WHEEL WRENCHES.

Specification forming part of Letters Patent No. 215,479, dated May 20, 1879; application filed November 11, 1878.

*To all whom it may concern:*

Be it known that I, NELSON R. PRATT, of Dover South Mills, of the county of Piscataquis, of the State of Maine, have invented a new and useful Carriage-Wheel Wrench; and do hereby declare the same to be described in the following specification and represented in the accompanying drawings, of which—

Figure 1 is a perspective view, and Figs. 2 and 3 longitudinal sections, of it, these sections being taken in planes at right angles with each other.

The implement consists, mainly, of a stock, or such and a handle thereto, two pairs of movable jaws, and their clamping screws or devices, all being substantially as set forth. In using it the pair of larger jaws are to be clamped to the hub of a wheel on its outer periphery or surface, and the smaller pair are to be clamped to the nut by which the wheel is maintained in connection with the journal of the axle of a carriage. This having been accomplished, by revolving the wheel the nut may be either turned off or on the screw of the journal, and when the wheel is off the journal the nut, by the implement, will be held in place relatively to the hub, the nut-clamping jaws being arranged directly between the others.

In the drawings, A denotes the stock, provided with a handle, *a*, and with the two pairs of jaws A' A" B B'. One of the lesser jaws, B B', may be in one piece with the stock, or, with its fellow, may be pivoted or hinged to such stock. The larger jaws, cushioned on their inner surfaces to bear on the wheel-hub without injury thereto, and hinged to the stock, are represented as arranged in a plane at right angles with that of the lesser jaws. Each pair of jaws is to be provided with a suitable clamping device, such as a screw, C or C', which goes through a slot, *b* or *b'*, of one jaw, and screws into and through the other jaw, all being arranged and formed substantially as represented. The shank of each screw has a shoulder, *c*, to bear against the jaw.

This little implement has been found in practice to be very efficient in removing a nut from the journal of a carriage-axle, to enable the wheel to be separated from the axle preparatory to oiling the box or journal. It is also equally useful in restoring the nut to place, as it enables such to be effected through the leverage of the wheel, and by the hand of a person applied to the rim of such wheel.

The jaws may be arranged in one plane, and provided with suitable devices for clamping them to the hub and nut of a wheel.

In some respects my wheel-wrench is like that described in the United States Patent No. 151,955, in which the hub-jaws are to grasp the wheel-hub rim on its outer and inner surfaces, and they are connected to the nut-jaws by an arm and a clamp-screw.

In my wrench I have no such arm or clamp-screw, and the hub-jaws are arranged to grasp the hub on opposite sides of its outer surface, and, besides, they have the nut-jaws arranged directly between them, all of which effects a new combination and arrangement of parts relatively to what is shown in the said patent.

Furthermore, the handle in my wrench is in line with the stock or in the axis of the wrench, and in no respect answers the purpose of a lever to revolve the wrench and wheel when connected. Therefore,

I claim as my invention—

1. The improved wheel-wrench consisting of the stock A and nut-jaws B B', arranged and combined, as set forth, with the jaws A' A", to embrace a hub on its outer surface or periphery, such jaws being provided with clamping-screws, as specified.

2. The handle *a*, stock A, jaws B B' and A' A", and screws C C', arranged and combined substantially as represented.

NELSON R. PRATT.

Witnesses:
PERRY A. DAVIS,
ELMER E. HILL.